United States Patent
Hazelhurst

[15] 3,696,329

[45] Oct. 3, 1972

[54] MARINE STREAMER CABLE

[72] Inventor: Gerald D. Hazelhurst, Houston, Tex.

[73] Assignee: Mark Products, Inc., Houston, Tex.

[22] Filed: Nov. 12, 1970

[21] Appl. No.: 88,616

[52] U.S. Cl. ............................... 340/7 R, 174/101.5
[51] Int. Cl. ............................................. H01b 7/12
[58] Field of Search .............. 340/7; 174/101.5, 23 R

[56] References Cited

UNITED STATES PATENTS

| | | | |
|---|---|---|---|
| 3,518,677 | 6/1970 | Florian | 340/7 R |
| 2,453,418 | 11/1948 | Dunsheath et al. | 174/101.5 |
| 3,427,393 | 2/1969 | Masterson | 174/23 R |

FOREIGN PATENTS OR APPLICATIONS

| | | | |
|---|---|---|---|
| 1,095,639 | 12/1967 | Great Britain | 174/110.44 |

Primary Examiner—Benjamin A. Borchelt
Assistant Examiner—R. Kinberg
Attorney—Hyer, Eickenroht, Thompson and Turner

[57] ABSTRACT

A streamer cable is disclosed that has a plurality of float members inside its outer sheath to add buoyancy and allow the diameter of the cable to be kept to a minimum. The sensors or hydrophones carried by the cable are connected accoustically to the water by a filler having good accoustic properties. The filler is either an elastomeric material cured in place or a high temperature-low viscosity, low temperature-high viscosity, grease-like material. A method of locating the float members for uniform buoyance is also disclosed.

4 Claims, 3 Drawing Figures

PATENTED OCT 3 1972　3,696,329

Gerald D. Hazelhurst
INVENTOR.

BY Hyer, Eickenroht,
Thompson & Turner
ATTORNEYS

MARINE STREAMER CABLE

This invention relates to marine cables, generally, and in particular to marine streamer cables that are towed through the water. In one of its aspects, it relates to a marine streamer cable having a generally uniform buoyancy along its length. In another aspect, it relates to fillers that couple the sensing devices with the ambient water. In yet another aspect, it relates to a method of assembling a marine streamer cable to have substantially uniform buoyancy along its length.

Marine streamer cables are used to tow sensing devices through water. One common sensing device so towed is a hydrophone for detecting sound waves that are traveling through the water after having bounced off underground structures. The hydrophones are spaced apart along the cable and electrically connected to recorders on the towing ship. The entire assembly of hydrophones, conductors, etc., is enclosed in an outer sheath of flexible material.

Streamer cables often are 8,000 – 9,000 feet long. When not in use they are coiled on a drum on the tow ship. The larger the diameter of the cable the larger the resulting coil for a drum of a given width. Therefore, for this reason it is desirable to keep the diameter of the cable to a minimum. Another reason for wanting to keep the diameter to a minimum is the extraneous "-noise" caused by the movement of the cable through the water. The smaller the diameter, the less the "-noise."

The cable gets its buoyancy, however, primarily from the material used to fill the unoccupied space in the outer sheath and connect accoustically the hydrophones to the ambient water. Preferably, the cable has approximately neutral buoyancy. Since the hydrophones are made of high specific gravity materials, a considerable volume of filler material, with a specific gravity less than one, is required to give a resultant neutral buoyancy to the cable. This limits the amount the diameter of the cable can be reduced.

It is an object of this invention to provide a marine cable having a minimum outside diameter.

It is another object of this invention to provide a marine streamer cable having the desired buoyancy where the inside diameter of the outer sheath of the cable need be only large enough to accommodate the sensors and other equipment covered thereby.

It is another object of this invention to provide a marine streamer cable having a plurality of float members positioned inside the outer sheath of the cable to give the cable the desired buoyancy while allowing the diameter of the cable to be kept to a minimum.

It is another object of this invention to provide a method of determining the location and the number of float members required to provide the desired buoyancy to a marine streamer cable.

In U.S. Pat. No. 3,518,677 issued June 30, 1970, and entitled "Electric Marine Cable," which patent is assigned to the same assignee to which this application is assigned, problems heretofore had with the filler material used in marine streamer cables is described. Such previously used filler material was usually a liquid hydrocarbon having a specific gravity less than one. The disadvantage of such a liquid was that it would leak out of the cable whenever the outer sheath was torn or for some reason developed a leak. In the aforesaid patent, a gelatinated filler material was suggested for use in place of liquid fillers so that should a leak or hole develop in the outer sheath of the cable, the filler material would tend to stay in place in the sheath.

It is another object of this invention to provide additional filler material that can be used to provide buoyancy to a marine streamer cable and to accoustically connect sensors carried by the cable to the ambient water and yet will not readily flow out of the cable even though the outer sheath thereof is torn or for some reason develops a hole through its wall.

It is another object of this invention to provide an improved filler for a marine streamer cable that can be placed inside the outer sheath of the cable as a low viscosity liquid after which the filler will increase in viscosity to the extent that it will not readily flow through a hole in the outer sheath of the cable.

It is another object of this invention to provide an improved filler for electric marine streamer cables that can be placed inside the outer sheath of the cable as a relatively low viscosity liquid and will thereafter cure into a resilient elastomeric-type material that will not only fill the outer sheath with a filler that will not leak through a hole in the wall of the outer sheat but will also provide shock absorbing material for surrounding the instruments in the streamer cable and also accoustically connect these instruments with the ambient water through the outer sheath.

It is another object of this invention to provide a filler material for an electric marine streamer cable that has a low viscosity when placed in the outer sheath of the cable but which will have a high viscosity, grease-like consistency when at the ambient temperature of the cable so as to resist leaking through openings in the outer sheath and which yet can be removed readily from the outer sheath to allow repairs to be made to the equipment or to adjust its buoyance.

It is another object of this invention to provide a filler material for the outer sheath of an electric marine streamer cable that has a high temperature-low viscosity, low temperature-high viscosity characteristic, so that the material can be raised to a temperature giving it a low viscosity when it is being placed inside the outer sheath to therefore allow the material to readily fill the outer sheath and displace all the air therefrom after which the material, when cooled to the ambient temperature of the cable, will have a high viscosity, grease-like consistency which will not readily flow through a hole in the outer sheath due to its high viscosity.

These and other objects, advantages, and features of this invention will be apparent to those skilled n the art from a consideration of this specification including the attached drawings and appended claims.

Figure 1:
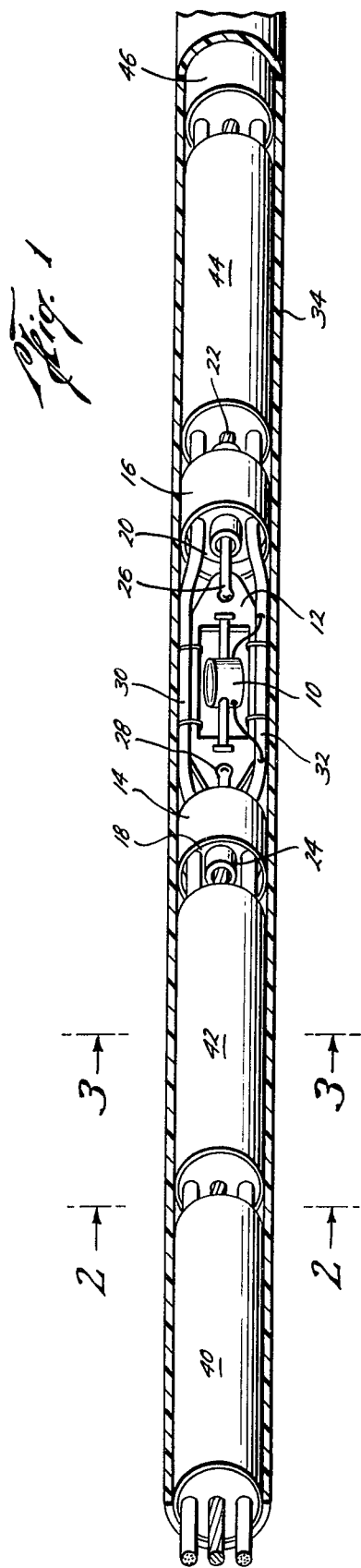
FIG. 1 is a vertical sectional view through the outer sheath of a portion of an electric marine streamer cable constructed in accordance with this invention.

The streamer cable shown in FIG. 1 is of the type where a plurality of hydrophones are located at spaced positions along the cable and electrically connected to the recorder on the ship behind which the streamer cable is towed. Only one hydrophone is shown in FIG. 1 along with a portion of the cable on adjacent sides thereof. It is to be understood that a large number of hydrophones are spaced along the cable. They are constructed and housed in the cable in the same manner as the one shown, so a description of only one such assembly is deemed sufficient.

In FIG. 1, hydrophone 10 is supported by hydrophone cradle 12. Located at opposite ends of the cradle are spacers 14 and 16. These spacers are cylindrical members of rigid material with at least one transverse partition, such as partitions 18 and 20 of spacer members 14 and 16, respectively.

The cable includes means that extend along the cable and has sufficient tensile strength to pull the cable through the water. In the embodiment shown, such means includes cable sections 22 and 24 that extend to the right and left as shown in FIG. 1 from each side of hydrophone 10. The tensile load in cables 22 and 24 is transmitted from one to the other through hydrophone cradle 12 which is attached to the two sections of cable by clevices 26 and 28 connected to opposite ends of the cradle. The clevices extend through openings in the spacer members 14 and 16 for connection to the cable sections.

Each hydrophone carried by the cable is electrically connected to recorder equipment on board the tow ship through electrical conductors that extend along the cable in two separate bundles 30 and 32. These two bundles of conductors extend through openings provided in spacer members 14 and 16 and along the side of hydrophone cradle 12.

The physical dimensions of the hydrophone assembly including conductor bundles 30 and 32 determine the minimum inside diameter of outer sheath 34, which forms the outside of the cable and encloses all of the hydrophones therewithin. As explained above, heretofore another criterion that had to be considered was the volume of filler material having a specific gravity less than one was required to offset the high specific gravity of the materials making up the hydrophone assembly in order to end up with a cable having close to neutral buoyancy. In accordance with this invention, however, outer sheath 34 need only be provided with an inside diameter sufficient to allow the placing of the hydrophone assembly therein. The outer sheath of the cable will be filled with a filler material to accoustically connect the hydrophones in the ambient water; however, the buoyancy required is primarily obtained through float members that are positioned inside the sheath to provide the desired buoyancy. In the embodiment shown in FIG. 1, float members 40, 42, 44 and 46 are positioned inside outer sheath 34 adjacent hydrophone 10. These float members comprise cylindrical chambers containing air at atmospheric pressure or, if desired, they can be pressured to an internal pressure equal to the head of water to which the cable will be exposed when in service. In this way, the pressure differential across the walls of the chambers will be a minimum.

Figure 3:
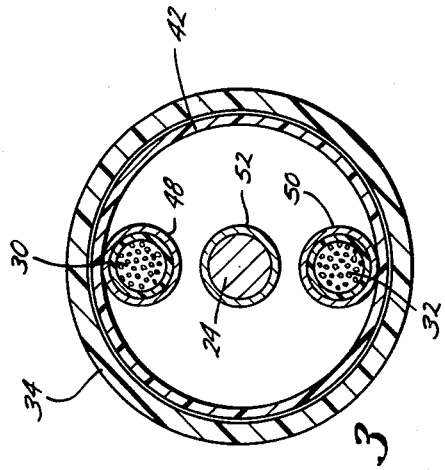
FIG. 3 is a sectional view taken along line 3—3 of FIG. 1.
Figure 2:
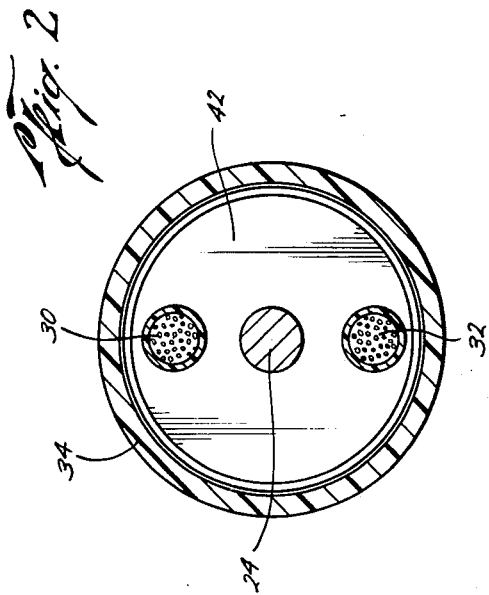
FIG. 2 is a sectional view taken along line 2—2 of FIG. 1.

As shown in FIGS. 2 and 3, in connection with float member 42, elongated tubes 48 and 50 extend through chamber 42 to provide a passageway for conductor bundles 30 and 32, respectively. In the same manner, tube 52 extends through the center of chamber 42 to allow cable section 24 to extend through the chamber and yet allow the chamber to maintain its internal pressure.

It is another feature of this invention to provide a method of determining the number and location of the float members to provide the cable with desired buoyancy. The cable, when completely assembled, will include what is described above. In addition, outer sheath 34 will be filled with a filler material to provide an accoustic coupling between hydrophone 10 and the ambient water through the outer wall of the sheath 34. In accordance with the method of determining the number and location of the float members required, the filler materials used in the initial practice of the method should be of the type that it can be readily removed from the sheath, the purpose of which will be apparent from the method now to be described.

In accordance with the method, the number of float members and their locations are determined as best can be determined through calculations, etc., and the cable is assembled and filled with a filler material having approximately the specific gravity of the material to be eventually used as the filler. The assembled cable is then placed in a tank of water of the specific gravity of the water in which the cable is to be used and the buoyancy of the cable determined. There may be portions of the cable that have too much buoyancy and others that have too little. To determine the amount of buoyance to add to a given portion, floats can be attached externally until the desired buoyancy is obtained. Weights can be attached to the portions of the cable that have too much buoyancy to determine the amount of buoyancy to be removed. Once this is done, the cable can be disassembled after the filler material is removed from the outer sheath and the location and number of float members adjusted in accordance with the results of the floatation tests. Then the entire design can be recorded and additional streamer cables using the same equipment can be constructed without having to go through the floatation tests for each cable.

In accordance with another aspect of this invention, filler materials are provided that will not leak out through holes or tears in the outer sheath. One such filler material is an elastomeric compound. Such a filler must be sufficiently resilient to allow the cable to be rolled up on a drum and stored aboard ship without damaging the filler. This type filler will also dampen shocks received by the cable to thereby protect the instruments encased therein. It will also provide a good accoustic coupling between the hydrophones in the cable and the ambient water. In addition, this material can be placed in the outer sheath as a liquid afterwhich it will cure into a resilient elastomeric material. Several compounds are on the market which can be used for this purpose. For example, a silicone base compound is sold by General Electric under the name GE-RTV 40. This material can be mixed with a General Electric product sold under the trademark "THERMOLITE-T-12" and placed in the outer sheath in a liquid state having a relatively low viscosity which allows it to easily reach and displace all the air from any unoccupied space within the cable. Once in place it will cure to an elastomeric type material having a durometer of about 40.

Polysulfides and polyurethanes can also be used. For example, Product Research Company of Los Angeles, California, markets a polysulfide designated PR-720. By mixing this product with this company's product PR-720 -T a filler material is formed that will remain in the liquid state long enough for the outer sheath to be filled, afterwhich it will cure into an elastomeric compound having a durometer of about 40. This same company markets a polyurethane compound designated PR-1535, Part A and Part B. These two liquids, when mixed together, will form an elastomeric filler having a durometer of about 90.

Coast Pro-Seal Manufacturing Company markets a polysulfide and a polyurethane compound that can be used for this purpose also. The polysulfide is designated Pro-Seal 727. When cured it has a durometer of about 40. The polyurethane is designated Pro-Seal 777 and cures to a durometer of about 60.

Alternatively, it may be desirable for the filler material to be reversible from a high viscosity state which is desirable when the cable is in service to a low viscosity state to allow the filler to be removed from the cable when desired. One such material having these characteristics is petrolatum in the semi-solid state. This material which is sold in one form under the trademark "Vaseline" has a relatively low viscosity when heated but when at the ambient temperature at which the cable will be operating, has a high viscosity, grease-like consistency and will resist flowing through holes formed in the outer sheath. This material also has a specific gravity of less than one and provides a good accoustic coupling between the hydrophone and the ambient water.

In the drawing, the filler material is not indicated, it being understood that it will fill all unoccupied space inside the outer sheath.

From the foregoing, it will be seen that this invention is one well adapted to attain all of the ends and objects hereinabove set forth, together with other advantages that are obvious and that are inherent to the apparatus and method.

The invention having been described, what is claimed is:

1. A method of constructing a streamer cable with substantially uniform buoyancy along its length, said cable having spaced sensors and float members enclosed in an outer sheath, comprising assembling the cable with the detectors and float members positioned inside the outer sheath, filling the unoccupied portion of the sheath with a high temperature-low viscosity, low temperature-high viscosity, grease-like filler material, said material being at a temperature such that the filler material is sufficiently fluid to readily flow into and fill the unoccupied space in the sheath, placing the cable into a body of water to determine if the cable has the desired buoyancy, attaching additional float members to the outside of the cable at any portion deficient in buoyancy until said portion has the desired buoyancy, raising the temperature of the filler, removing the filler, positioning additional float members in the cable assembly at the desired location, and refilling the outer sheath with the desired filler material.

2. The method of claim 1 in which the outer sheath is refilled with an elastomeric material that is sufficiently fluid when placed therein to displace substantially all of the air therein after which it is cured into a resilient body.

3. The method of claim 1 in which the sheath is refilled with said high temperature-low viscosity, low temperature-high viscosity material.

4. A method of constructing a streamer cable with substantially uniform buoyance along its length, said cable having spaced sensors and float members enclosed in an outer sheath, comprising assembling the cable with the detectors and float members positioned inside the outer sheath, filling the unoccupied portion of the sheath with a filler material that can be removed therefrom when desired, placing the cable into a body of water to determine if the cable has the desired buoyancy, attaching additional float members to the outside of the cable at any portion deficient in buoyancy until said portion has the desired buoyancy, removing the filler, positioning additional float members in the cable assembly at the desired location, and refilling the outer sheath with the same filler material or one having the same specific gravity as the first filler.

* * * * *